Figure 1:
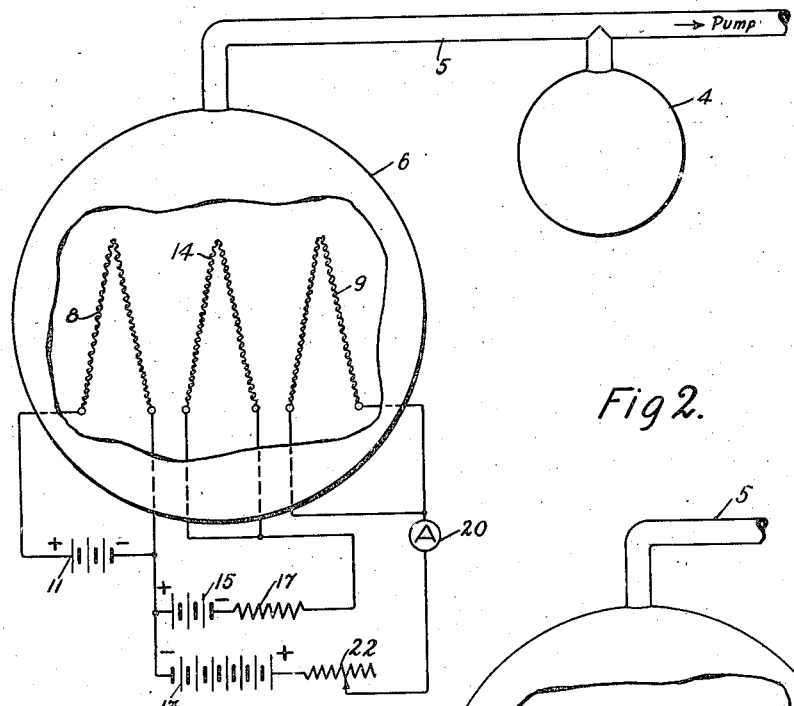

H. D. ARNOLD.
METHOD AND APPARATUS FOR MEASURING GAS PRESSURES.
APPLICATION FILED APR. 28, 1917.

1,356,687.

Patented Oct. 26, 1920.

Inventor:
Harold D. Arnold.
by ᴅ.ᴄ.ᴀ̲ᴀᴀᴀᴀ. Att'y

UNITED STATES PATENT OFFICE.

HAROLD D. ARNOLD, OF EAST ORANGE, NEW JERSEY, ASSIGNOR TO WESTERN ELECTRIC COMPANY, INCORPORATED, OF NEW YORK, N. Y., A CORPORATION OF NEW YORK.

METHOD AND APPARATUS FOR MEASURING GAS-PRESSURES.

1,356,687.  Specification of Letters Patent.  Patented Oct. 26, 1920.

Application filed April 28, 1917. Serial No. 165,212.

*To all whom it may concern:*

Be it known that I, HAROLD D. ARNOLD, a citizen of the United States, residing at East Orange, in the county of Essex and State of New Jersey, have invented certain new and useful Improvements in Methods and Apparatus for Measuring Gas-Pressures, of which the following is a full, clear, concise, and exact description.

This invention relates to a method and apparatus for measuring gas pressures, and in particular for measuring exceedingly minute pressures, such as are present in vacuum tubes used for electrical discharges of various characters.

The ordinary mercury manometer can be used directly for the measurement of pressures as low as one-tenth of a millimeter of mercury, and, in the form of the so-called McLeod gage, may be used for considerably smaller pressures. The McLeod gages have been used to measure or indicate pressures as low as $10^{-6}$ millimeters, that is, one millionth of a millimeter, but even before this region is reached, they lose enormously in accuracy, due to the occlusion or condensation of gases, or both, on the walls of the containing vessels and attached apparatus. In the case of the measurement of pressures of vapors, such as mercury vapor, they fail entirely.

In this invention is disclosed a method which is independent of such effects as occlusion or condensation, in that measurements are not made of the pressure directly, but rather of the number of molecules present in a given volume, from which the pressure may then be calculated.

This invention depends on the fact that if two electrodes are placed in a perfect vacuum, one of these being capable of acting as an electron source, and being brought to a potential lower than the other, then a pure electron current will flow from the cathode or electron source to the anode. If now a third electrode is placed adjacent to, and is maintained at a lower potential than either of said two electrodes, the value of the current between the anode and the cathode will depend upon the potential of the third electrode, increasing with increase in said potential, and becoming zero for a certain critical value. No current will flow to or from this third electrode, for the negative electrons coming from the electron source, can travel only to an electrode of higher potential. If, however, a small amount of gas is introduced into the space surrounding the electrodes, and a fairly high potential difference is applied between the first two electrodes, the electrons passing to the anode will acquire sufficient velocity to ionize some of the molecules, giving thereby positive and negative ions. The positive ions will travel to the negatively charged electrodes and chiefly to that one which is at the lowest potential, that is to the third electrode. If now an impedance, such as a resistance, is inserted between the third electrode and its source of potential, the current, due to these positive charges flowing through this resistance, will produce a fall of potential across its terminals which would be opposed to the electromotive force of said source of potential. The potential of the third electrode will then become more positive in value, thereby increasing the space current between the cathode and anode. The change in this space current is, therefore, an indication of the presence of positive ions, and the magnitude of this change would be an indication of the number of positive ions present; and since the number of positive ions is proportional to the amount of gas present, this change may be used for finding the pressure exerted by said gas.

The method and apparatus for measuring gas pressures according to this invention constitute an improvement over the apparatus for measuring gas pressures described in a copending application of Oliver E. Buckley, Serial No. 133,609, filed November 27, 1916 on "Method and apparatus for measuring gas pressure."

Figure 2:
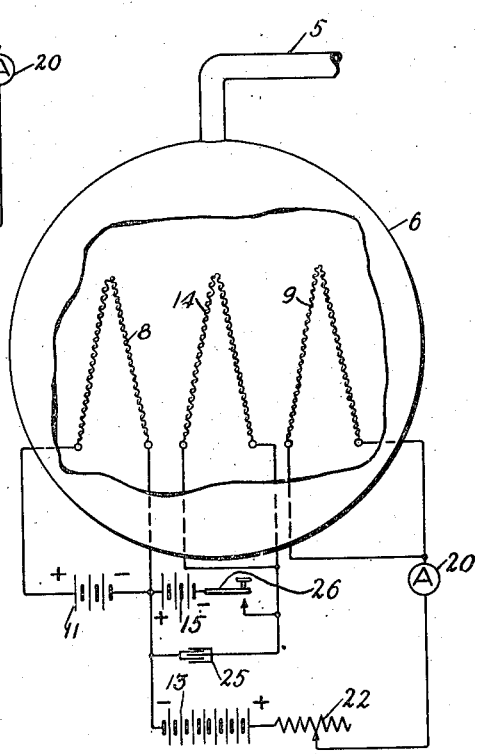

The invention will be better understood by reference to the following detailed description taken in connection with the accompanying drawings, in which Figure 1 shows apparatus attached to a vessel to be evacuated, by means of which apparatus the desired information may be obtained; Fig. 2 is a modification of Fig. 1.

Referring to Fig. 1, 4 represents a vessel, the gas pressure of which is to be measured. A connecting tube 5 extends from this vessel to a vessel 6 in which there is inclosed a source of electrons 8, and an electrode 9 serving as an anode. This source of electrons may be of any suitable form, such, for example, as a filament heated by a battery 11. Connected between the elements 8 and 9 is a battery 13, the positive pole of which is connected to the anode 9. Under these circumstances, electron current will flow from the cathode 8 to the anode 9.

Adjacent to, and preferably between, the elements 8 and 9 is placed an electrode 14. A battery 15 is connected from the electron source to the element 14. This battery 15 has its negative terminal connected to the member 14 in order that it may be maintained at a potential lower than that of the electron source 8.

If the space within the vessel is a perfect vacuum, the space current between the members 8 and 9 will be a pure electron current, the one source of carriers being the element 8. Inasmuch as the negatively charged electrons from the element 8 can pass only to a member which is at a higher potential, it will be apparent that no current can flow to or from the member 14. If, however, there is present a small amount of gas and the voltage of the battery 13 is sufficiently high, the electrons will acquire sufficient velocity to ionize some of the gas molecules, and there will then be present both negative and positive ions. The positive ions will travel to the negatively charged electrodes and chiefly to that one which is at the lowest potential, that is, the electrode 14; and in view of the fact that this electrode serves as a collector of positive carriers, it may be spoken of as the collector electrode. The collection of these positive charges on the collector member consequently causes a current to flow through the resistance 17, thereby causing a drop of potential across its terminals. This drop of potential will be in such a direction that the collector will be made more positive, which will allow more electrons to pass from the cathode to the anode. It, therefore, follows that for an electrical system with given electrical constants, the space current will be a measure of the pressure up to a certain maximum pressure, increasing with increase of pressure and decreasing with decrease of pressure. The value of the space current at any instant may be measured by the ammeter 20.

It is apparent, of course, that the space current will depend upon the voltage of the battery 13, and that the higher this voltage, the larger the amount of gas ionized, and therefore the greater the change in space current for a given change in pressure. In other words, the sensitivity of this indicator can be controlled by the battery 13. For any given value of voltage of the battery 13, however, the amount of ionization will be proportional to the amount of gas present if the amount of this gas does not exceed a certain value. Having therefore once calibrated this apparatus by any suitable means, it may be used repeatedly for the measurement of pressures within the tube itself or within any vessel or vessels to which it may be attached, assuming that the attachment is such as to give the same pressure within the tube and the vessels. The readings may be taken while the vessels are being actually evacuated by means of any suitable pump, and they may be taken conveniently and rapidly without in any way affecting the operation of the pump, for the measurement consists merely in following the reading of the ammeter 20.

It has been found that the current through the ammeter 20 is proportional to the electron or space current flowing from the element 8 to the element 9, and that, therefore, the sensitivity of the gage may be increased by increasing this electron current. The constants of the measuring device will, of course, depend upon the size of the tube itself, the nature of the inclosed gas and upon the dimensions and relative positions of the three electrodes contained therein, as well as upon the characteristics of the circuit external to the vessel, but if these elements are all kept constant, the device may be used repeatedly and will give strictly concordant results. The original value of the space current flowing from the cathode to the anode may be controlled by changing the voltage of the battery 13 or by means of the adjustable resistance 22. This vacuum gage has been found to work successfully with pressures as high as $10^{-2}$ millimeters of mercury, the lower limit being determined solely by the sensitivity of the ammeter 20.

In Fig. 2, instead of a resistance, a condenser 25, preferably of small capacity, is inserted between the cathode 8 and the collector 14. The collector battery 15 is shown permanently connected to one side of the cathode and connected by a key 26 to the collector member. When the key 26 is closed, the battery 15 brings the collector to a definite potential and at the same time charges the condenser 25. If there is a perfect vacuum in the vessel, the condenser will retain its charge and the anode current will remain constant when the key is opened. But if there is gas present, the positive ions formed by the ionization of the gas in the vessel and collected on the collector member will discharge the condenser 25 at a rate depending upon the number of ions formed in the vessel and the capacity of the condenser. The discharge of the condenser will cause a corresponding change in the potential of the collector which will vary the space current. Thus, it follows that, on opening the key 26, the rate of discharge of the condenser, and, consequently, the rate of change of the space current, as indicated by the ammeter 20, will be proportional to the pressure of the gas in the vessel; the greater the pressure, the faster will be the rate of change of the space current. Hence, after the device has been suitably calibrated, the value of the pressure in the vessel may be readily determined by the rate of change of the space current.

The electrodes may have any form or disposition, but, in the preferred arrangement in which the electrode 14 is placed between the electrodes 8 and 9, this element should be of such a form that it does not entirely block the electronic current to the anode, that is, it should preferably be of some grid construction, but it is obvious that a very wide latitude of construction is permissible in this structure. One convenient form which the elements may take is that shown in the drawing, in which all electrodes are in the form of filaments with both terminals of the filaments coming out of the tube. This permits of a previous heat treatment of the electrodes by means of which occluded gases may be driven off to prevent later disturbances due to these gases, when the device is in actual operation. In actual operation, however, the two terminals of anode 9 may be connected and the two terminals of collector 14 may be connected, as shown in the figure.

The apparatus, as described, is adapted for many applications for which other manometers cannot be readily used, such, for example, as the measurement of vapor pressures of metals, etc., and for the measurement of pressure changes extending over a long period of time, for which more expensive manometers cannot be well employed.

What is claimed is:

1. Apparatus for measuring gas pressures comprising an evacuated vessel, three electrodes within said vessel, one of said electrodes being a source of electrons, and means for maintaining between said source of electrons and a second electrode an electron current of a normally steady value sufficient to ionize the gas, means for maintaining the third electrode at a normally fixed negative potential with respect to the first electrode, an impedance connected to said third electrode, and a current measuring instrument in the circuit connecting the first and second electrodes.

2. An evacuated vessel containing means for producing an electron stream, means for controlling said electron stream, means associated with said controlling means whereby the ionization of the gas contained in said second vessel produced by said stream causes proportional changes in the potential of said control means, and means for measuring the change in the electron stream resulting therefrom, whereby the pressure in said vessel may be determined.

3. An apparatus for measuring the pressure within an evacuated vessel comprising a second vessel adapted to be attached to the vessel to be evacuated, said second vessel containing a thermionic cathode, an anode and a collector electrode, said collector electrode being adapted to control the thermionic emission of said cathode, a source of electro-motive force between said cathode and anode, means associated with said collector electrode whereby the potential of said collector electrode is changed in accordance with the ionization produced in the gas in said vessel thereby changing accordingly the thermionic current from said cathode to said anode, and means for detecting said changes in current.

4. An apparatus for measuring the pressure within an evacuated vessel comprising a second vessel adapted to be attached to the vessel to be evacuated, said second vessel containing three electrodes, one of said electrodes being a source of electrons, means for establishing a space current between the said source of electrons and a second of said electrodes, the third of said electrodes being adapted to control said space current, means associated with said third electrode whereby the positive ionization produced in the gas in said second vessel by said space current changes the potential of said third electrode, and means associated with said first and second electrodes for detecting the resultant changes in space current.

5. An apparatus for measuring the pressure within an evacuated vessel comprising a second vessel adapted to be attached to the vessel to be evacuated, said second vessel containing an anode, a thermionic cathode and a control electrode, a source of electromotive force between said anode and cathode adapted to drive off the electrons from said cathode with a sufficient velocity to ionize the gas in said second vessel, a source of negative potential for said control electrode whereby the value of the space current is determined by the potential of said source, an impedance connected to said control electrode whereby the positive ionization produced in said gas is enabled to change the potential of said control electrode, thereby changing the space current in accordance with the amount of ionization present at any given time, and an ammeter connected between said anode and cathode for measuring the resultant change in space current.

6. An apparatus for measuring the pressure within an evacuated vessel comprising a second vessel adapted to be attached to the vessel to be evacuated, said second vessel containing an anode, a thermionic cathode and a control electrode, a source of electromotive force between said anode and cathode adapted to drive off the electrons from said cathode with a sufficient velocity to ionize the gas in said second vessel, a source of negative potential for said control electrode whereby the value of the space current is determined by said potential source, a resistance connected between said control electrode and said potential source whereby the positive ionization incident upon said collector and flowing through said resistance produces a drop of potential across the terminals of said resistance thereby correspondingly changing the potential of said control electrode, and an ammeter connected between said anode and cathode for measuring the resultant changes in space current.

7. The method of determining gas pressures which involves the establishment of a normally steady electron current between two electrodes within a gas space, maintaining a third electrode at a normal potential, and detecting the variations in said electron current produced by the change of potential of the third electrode due to gas ionization, from which the gas pressure may be deduced.

8. An apparatus for determining gas pressures involving a pair of electrodes within a gas space between which a steady space current stream is produced, a third electrode adapted to have a normally fixed voltage, and means in circuit with the first mentioned electrodes to indicate the variations in space current produced by the potential variations of the third electrode due to gas ionization, from which the gas pressure may be deduced.

In witness whereof, I hereunto subscribe my name this 27th day of April, A. D., 1917.

HAROLD D. ARNOLD.